United States Patent [19]
Nishikado

[11] Patent Number: 5,995,883
[45] Date of Patent: Nov. 30, 1999

[54] AUTONOMOUS VEHICLE AND CONTROLLING METHOD FOR AUTONOMOUS VEHICLE

[75] Inventor: Masashi Nishikado, Osaka, Japan

[73] Assignee: Minolta Co., Ltd., Osaka, Japan

[21] Appl. No.: 08/870,715

[22] Filed: Jun. 6, 1997

[30] Foreign Application Priority Data

Jun. 9, 1996 [JP] Japan .................... 8-145748

[51] Int. Cl.⁶ .................................... G06F 165/00
[52] U.S. Cl. .................... 701/23; 701/25; 701/300; 15/319; 180/169
[58] Field of Search .................... 701/23, 300, 25; 180/169; 15/319

[56] References Cited

U.S. PATENT DOCUMENTS

| | | |
|---|---|---|
| 4,632,543 | 12/1986 | Endo . |
| 4,855,915 | 8/1989 | Dallaire ............................ 701/23 |
| 5,109,566 | 5/1992 | Kobayashi et al. .............. 15/319 |
| 5,229,941 | 7/1993 | Hattori . |
| 5,234,071 | 8/1993 | Kajiwara . |
| 5,461,357 | 10/1995 | Yoshioka et al. . |

FOREIGN PATENT DOCUMENTS 2265042  3/1992  United Kingdom .......... 1/16

*Primary Examiner*—William A. Cuchlinski, Jr.
*Assistant Examiner*—Olga Hernandez
*Attorney, Agent, or Firm*—McDermott, Will & Emery

[57] ABSTRACT

An autonomous vehicle has a distance measuring sensor that periodically measures the distance to an object using a prescribed period and it's movement is controlled in accordance with the distance measured by the distance measuring sensor. A controller that controls the prescribed period based on the moving speed and the measured distance so that the prescribed period is made shorter as the moving speed increases and the distance to the object becomes shorter.

10 Claims, 7 Drawing Sheets

AUTONOMOUS VEHICLE AND CONTROLLING METHOD FOR AUTONOMOUS VEHICLE

BACKGROUND OF THE INVENTION

The present invention pertains to an autonomous vehicle having a distance measuring sensor that measures the distance to an object without touching said object.

As one example of a conventional distance measuring sensor, FIG. 9 shows the construction of a distance measuring sensor using the infrared active method. The ray of infrared light that is output from infrared LED 401, as detection waves output toward the object for the purpose of distance measurement, is projected onto object 403, which is the object of measurement, via projection lens 402. Part of the infrared ray that is reflected irregularly by object 403 forms an image on light receiving element 405 via condenser lens 404. In other words, this distance measuring sensor measures the distance to the object based on the location of the reflected light which forms an image on light receiving element 405 using the principle of triangulation. Conventional distance measuring sensors periodically perform distance measurement using a prescribed period by being driven at prescribed constant intervals.

Now, where the distance measuring sensor described above is mounted on an autonomous vehicle, when the autonomous vehicle moves at a high speed, the distance over which the autonomous vehicle travels between the previous distance measurement session and the current distance measurement session becomes large, which prevents the successful performance of accurate distance measurement. Therefore, one solution to this problem is to periodically perform distance measurement using the smallest possible period regardless of the state of the movement of the autonomous vehicle. However, because with this method distance measurement is carried out using the smallest possible period even when a larger distance measurement period would not pose a problem, such as when the distance to the object is short or when the autonomous vehicle is moving slowly or not at all, for example, detection waves (infrared ray) output toward the object for the purpose of distance measurement are output to an unnecessary degree, and excess power is consumed.

SUMMARY OF THE INVENTION

The present invention was made in consideration of the problem described above. Its object is to calculate the necessary and sufficient distance measurement period in response to the moving speed or location of the autonomous vehicle and to periodically perform distance measurement using said distance measurement period, and to conserve power by stopping distance measurement and eliminating the consumption of power caused by the unnecessary output of detection waves comprising an infrared ray, for example, output toward the object for the purpose of distance measurement when it is determined that distance measurement is not necessary.

Therefore, the autonomous vehicle of the present invention has a driver that moves the vehicle body; a distance measuring sensor that periodically measures the distance to the object using a prescribed period; a speed detector that detects the moving speed of the vehicle body; and a controller that controls said prescribed period based on the moving speed detected by said speed detector. Said controller performs control so that said prescribed period is made shorter as the moving speed increases.

The autonomous vehicle of the present invention also has a distance measuring sensor that periodically measures the distance to the object using a prescribed period and a controller that controls the period for the driving of the distance measuring sensor based on the distance to the object that is detected by the distance measuring sensor. Said controller performs control so that said prescribed period is made shorter as the distance to the object becomes shorter.

These and other objects and features of the present invention will be apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DETAILED DESCRIPTION OF THE INVENTION

An autonomous vehicle, an embodiment of the present invention, is explained below with reference to the drawings.

Figure 1:
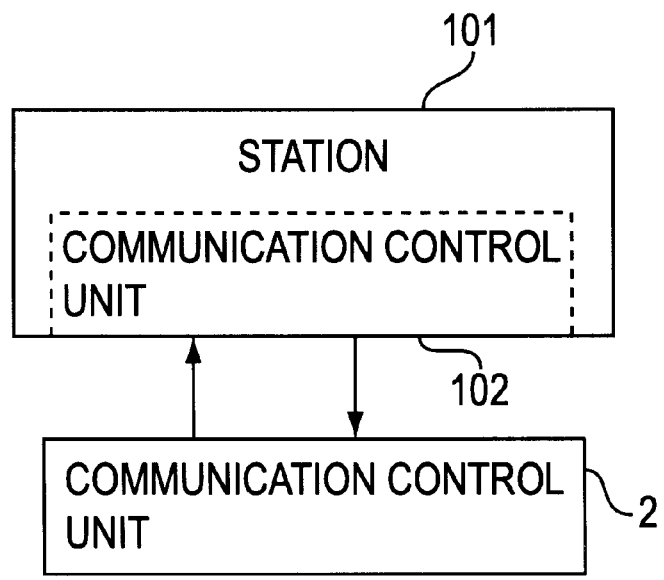
FIG. 1 is a drawing to explain the transmission of data between the autonomous vehicle of the present invention and a station.

The autonomous vehicle of the present invention is capable of two way communication with station 101. As shown in FIG. 1, station 101 is equipped with communication control unit 102, and transmits to communication control unit 2 of the autonomous vehicle, via communication control unit 102, command signals for sending work instructions to the autonomous vehicle, confirming the location of the autonomous vehicle, charging the battery of the autonomous vehicle or storing the autonomous vehicle, for example. On the other hand, information regarding the location of the autonomous vehicle, etc., is sent to communication control unit 102 of station 101 from communication control unit 2 of the autonomous vehicle.

Figure 2:
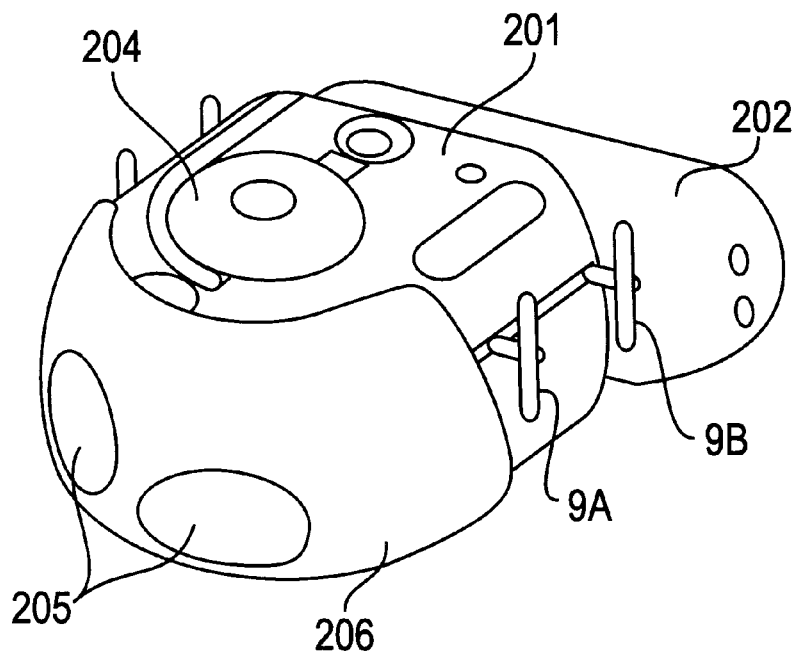
FIG. 2 is a drawing showing the external view of the autonomous vehicle of the present invention.

FIG. 2 shows an external view of the autonomous vehicle. This autonomous vehicle comprises moving unit 201 and cleaning unit 202. It performs cleaning of the floor using cleaning unit 202 while moving on the floor using moving unit 201. 9A and 9B in said drawing are contact distance measuring sensors. They measure the distance to the object while being in contact with the object, which may be an obstacle or wall, for example. 204 is a chemical tank. The floor is cleaned by cleaning unit 202 while a chemical agent stored in this tank is being applied to the floor. 205 are distance measuring sensor windows. Detection waves output from distance measuring sensor 1 located inside the autonomous vehicle (an infrared ray, for example) are projected onto the object through these distance measuring sensor windows 205. 206 is a bumper sensor. When this bumper sensor comes into contact with an obstacle or wall, the movement of the vehicle body of the autonomous vehicle comes to a halt.

Figure 3:
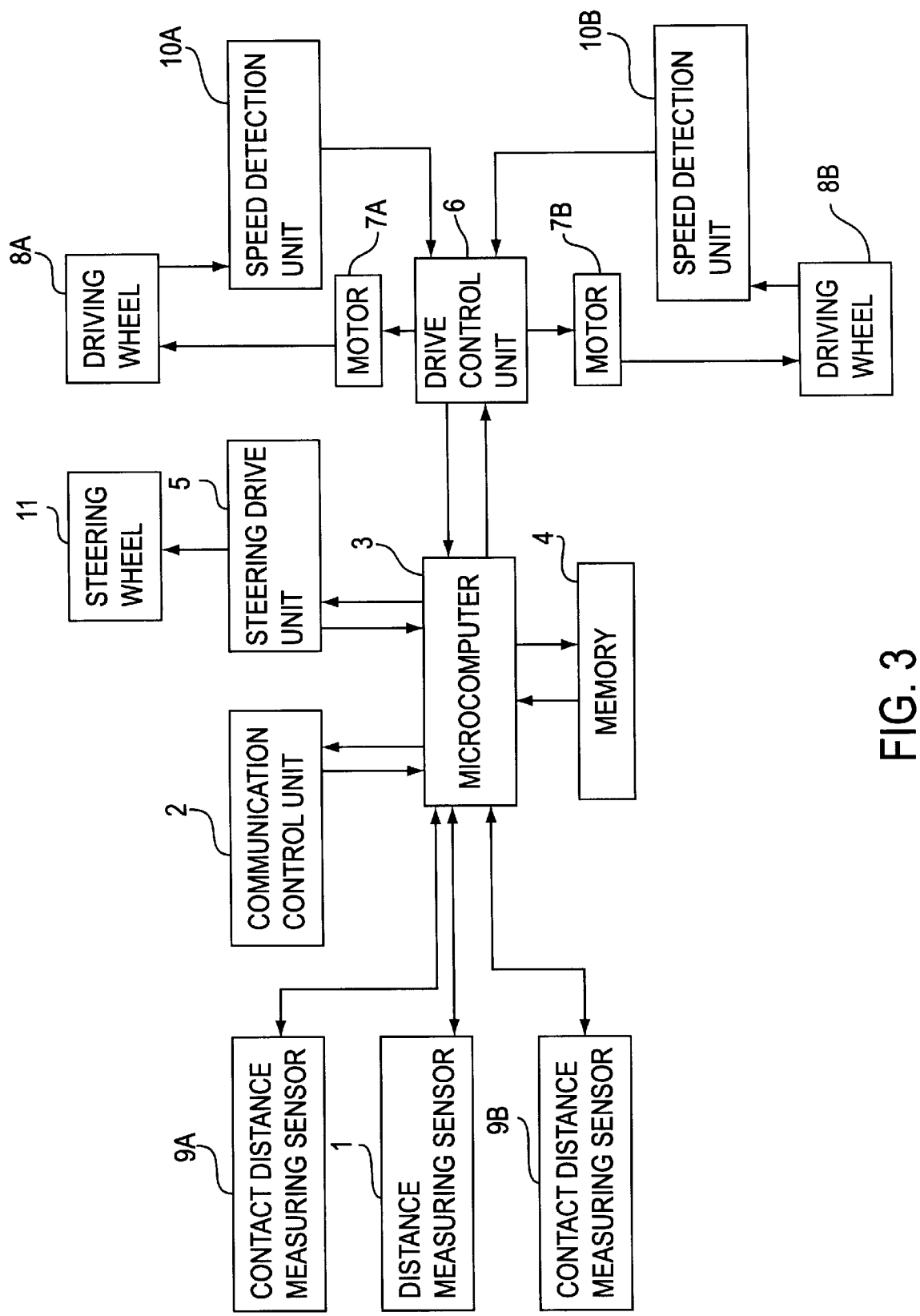
FIG. 3 is a block diagram regarding the autonomous vehicle of the present invention.

FIG. 3 is a block diagram pertaining to the autonomous vehicle. In the explanation below, only those components that are necessary for movement control and distance measurement with regard to this embodiment are shown, and other components are omitted from the explanation because they are the same as those used in public domain autonomous vehicles.

Figure 9:
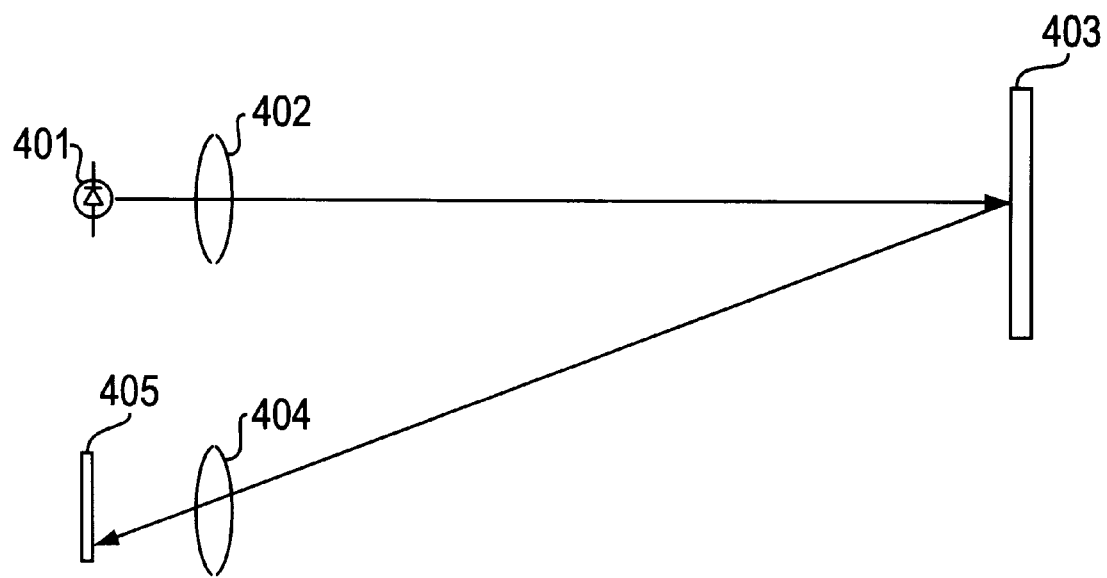
FIG. 9 is a drawing to explain the principle of a conventional distance measuring sensor using the infrared active method.

Distance measuring sensor 1 measures the distance between the autonomous vehicle and the object without touching the object. A distance measuring sensor using the above-described infrared active method shown in FIG. 9 is used for distance measuring sensor 1 in this embodiment, but other types of sensors such as a passive distance measuring sensor, ultrasound reflecting distance measuring sensor or laser reflecting distance measuring sensor may be used instead. Contact distance measuring sensors 9A and 9B measure the distance between the autonomous vehicle and the object in place of non-contact distance measuring sensor 1 while being in contact with the object when said distance becomes short. 2 is a communication control unit that performs transmission and reception of information to and from communication control unit 102 of station 101.

Memory 4 stores programs, map information, etc., that are necessary for the control of the autonomous vehicle. Steering drive unit 5 controls steering wheel 11 to control the steering of the autonomous vehicle. 6 is a drive control unit, 7A and 7B are motors, and 8A and 8B are driving wheels. Drive control unit 6 controls motors 7A and 7B independently of each other, which enables driving wheels 8A and 8B to rotate independently of each other, said driving wheels being connected to motors 7A and 7B, respectively.

Figure 4:
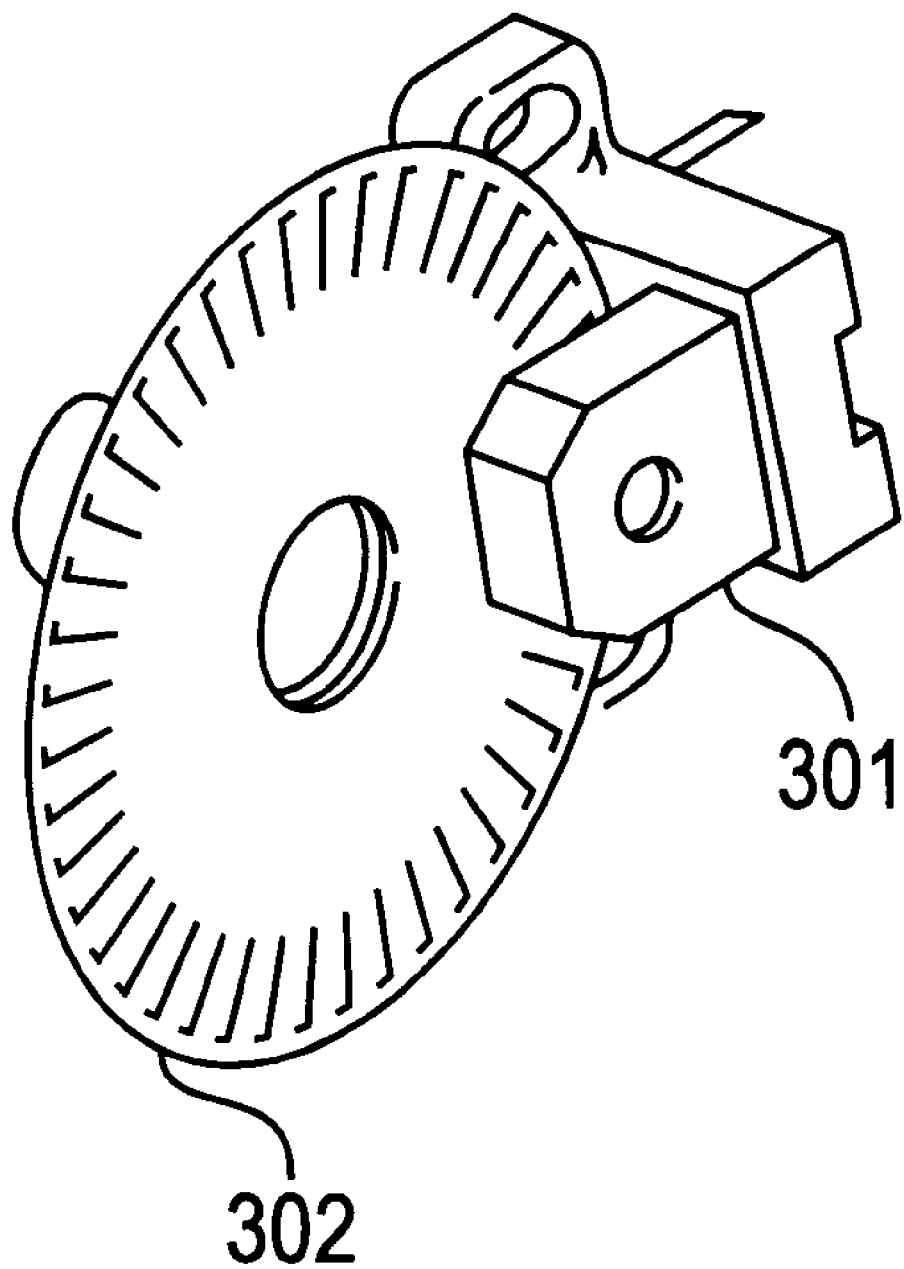
FIG. 4 is a drawing showing the speed detection unit of the autonomous vehicle of the present invention.

Speed detection units 10A and 10B detect the rotation speeds of driving wheels 8A and 8B, and send the detected speed data to drive control unit 6. The details of speed detection units 10A and 10B will be explained with reference to FIG. 4.

302 is a cord wheel. It is connected to driving wheels 8A and 8B and rotates at the same rate as driving wheels 8A and 8B. 301 is a transmission photosensor. It counts the number of rotations of cord wheel 302 per unit time, or in other words, the number of rotations of driving wheels 8A and 8B. The amount of movement of the autonomous vehicle is then calculated from the number of rotations of driving wheels 8A and 8B measured by speed detection units 10A and 10B and the diameters of driving wheels 8A and 8B. The moving speed of the autonomous vehicle is calculated by dividing the resulting amount of movement by a prescribed period of time.

Returning to FIG. 3, the explanation will now be continued. Microcomputer 3 performs a comprehensive evaluation of the programs or map information stored in memory 4, commands received by communication control unit 2 from station 101, information regarding the distance between the autonomous vehicle and the object that is received from distance measuring sensor 1 and contact distance measuring sensors 9A and 9B, information regarding steering wheel 11 that is received from steering drive unit 5, and information regarding driving wheels 8A and 8B that is received from drive control unit 6, and then determines the subsequent operation of the autonomous vehicle. It then controls the drive and steering of the autonomous vehicle via steering drive unit 5 and drive control unit 6 such that the operation that was decided on will be carried out.

Microcomputer 3 also determines the output intensity for the detection waves output from distance measuring sensor 1 for the purpose of distance measurement and the distance measurement period based on the rotation rate of driving wheels 8A and 8B received from drive control unit 6, or in other words, the information regarding the moving speed of the autonomous vehicle and the information regarding the distance between the autonomous vehicle and the object that is received from distance measuring sensor 1.

The output intensity from distance measuring sensor 1 and distance measurement period will be explained below.

Figure 5:
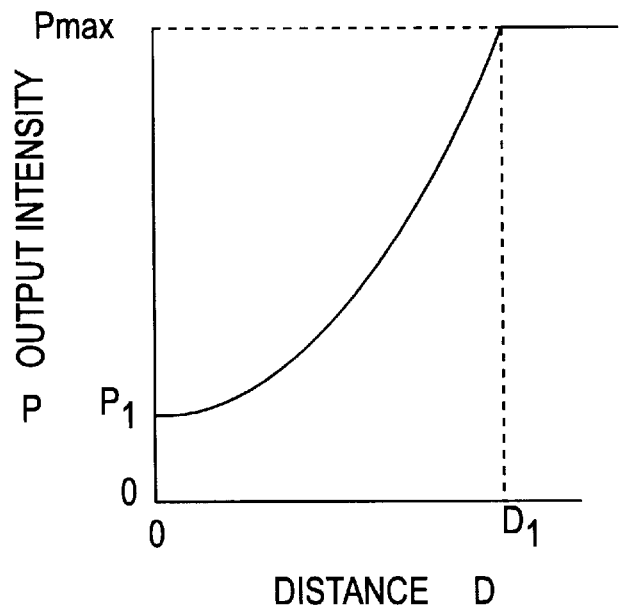
FIG. 5 is a drawing to explain the optimization of the light intensity of the detection waves output from the distance measuring sensor mounted on the autonomous vehicle of the present invention.

First, the output intensity will be explained with reference to FIG. 5. FIG. 5 shows the relationship between distance D between the autonomous vehicle and the object and output intensity P from distance measuring sensor 1 of this embodiment. It is obvious from FIG. 5 that distance measuring sensor 1 of this embodiment increases its output intensity P as distance D between the autonomous vehicle and the object increases. However, for distances longer than distance D1 at which maximum output $P_{max}$ is necessary to carry out distance measurement (2,000 mm in this embodiment), maximum output $P_{max}$ is used for distance measurement regardless of the length of distance D.

In the case of a distance measuring sensor using the infrared active method, the output intensity is the emission intensity from the infrared LED. Because this emission intensity is proportional to the square of the distance, the most common formula would be equation (1) shown below.

$$P = P1 + K(D+a)^2 \tag{1}$$

where,
P: infrared LED emission intensity
D: distance to the object ($0 \leq D \leq D1$) (mm)
P1: minimum emission intensity necessary for distance measurement K,
a: specific values determined based on various properties of the autonomous vehicle, the environment in which it moves, etc.

P1, K and a are 50 mA, 1.3 and 20 mm, respectively, in this embodiment.

To express the output intensity from distance measuring sensor 1, various calculation methods other than equation (1) shown above are possible depending on the configuration of the object and the measurement environment, including the reflectance and ambient brightness. Where distance measuring sensor 1 is an ultrasound-based sensor, for example, the output intensity is the ultrasound intensity. Where it is a laser reflecting sensor, the output intensity is the intensity of the laser output, and where it is a passive sensor, the output intensity refers to the intensity of the output of the pattern light that is projected onto the object.

The emission intensity changing unit of this embodiment will now be explained.

Figure 6:
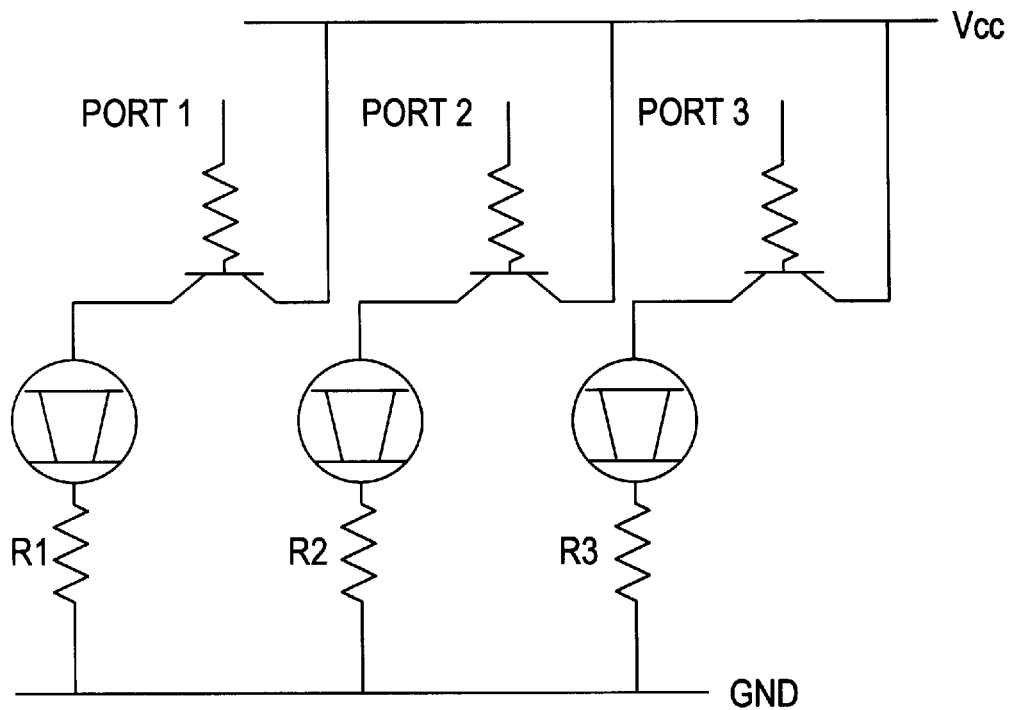
FIG. 6 is a circuit diagram for changing the light intensity of the detection waves output from the distance measuring sensor mounted on the autonomous vehicle of the present invention.

FIG. 6 is a circuit diagram with regard to the changing of the emission intensity of the infrared LED. Drive circuits having different resistances (R1–R3) are used for the multiple output ports. By selecting one of ports 1 through 3 depending on the needed emission intensity and turning ON the drive circuit for the selected port, the emission intensity of the infrared LED may be changed. In this embodiment, R1 is set at 10 Ω, R2 is set at 5 Ω, R3 is set at 3 Ω, and Vcc is set at 5V. In other words, if port 1 is selected, a low emission intensity is obtained. If port 2 is selected, a mid-level emission intensity is obtained. If port 3 is selected, a high emission intensity is obtained.

Figure 7:
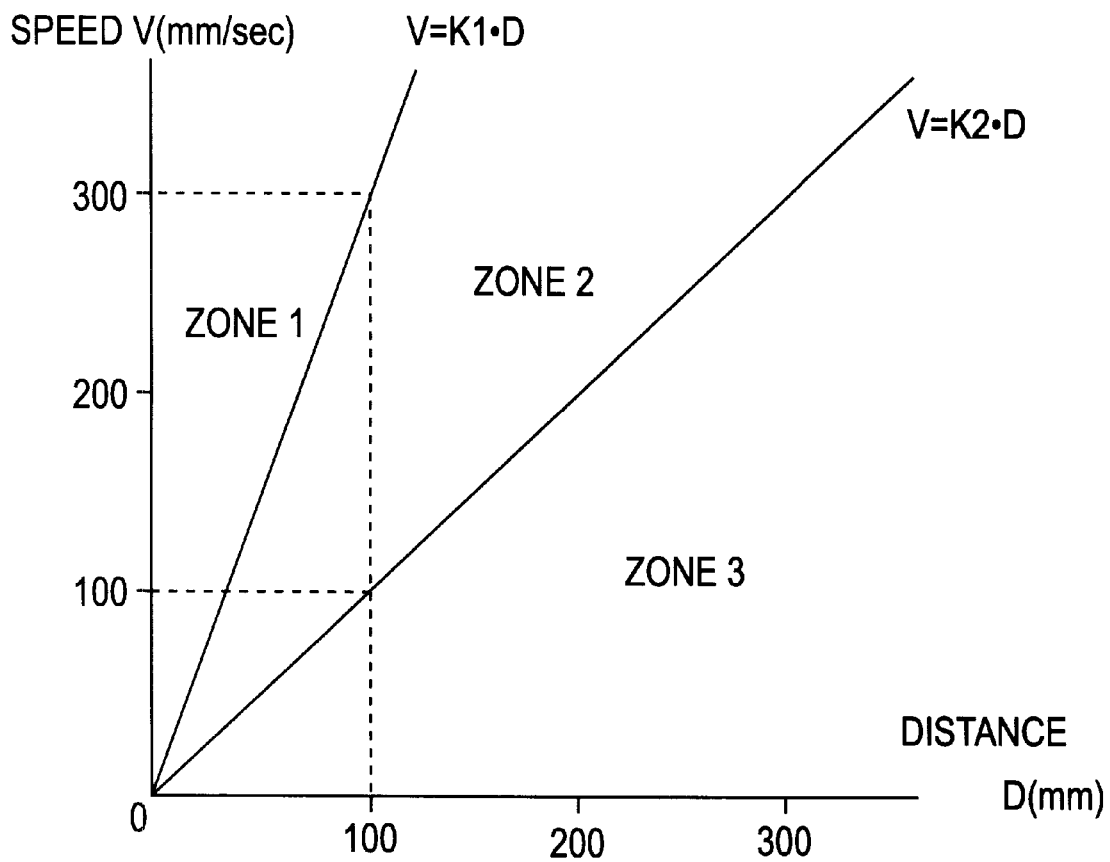
FIG. 7 is a drawing to explain the optimization of the period for driving the distance measuring sensor mounted on the autonomous vehicle of the present invention.

The distance measurement period will now be explained. FIG. 7 is a drawing to explain distance measurement using an optimal period. In the drawing, V is the moving speed of the autonomous vehicle, D is the distance to the object, and K1 and K2 are constants for the sake of convenience. The distance measurement period is determined based on moving speed V of the autonomous vehicle and distance D to the object. In other words, where the distance to the object is long, if the moving speed of the autonomous vehicle is fast, distance measurement must be carried out using a short period. Conversely, even if the distance to the object is short, if the moving speed of the autonomous vehicle is slow, distance measurement may be performed using a long period.

In FIG. 7, three distance measurement zones are set as distance measurement zones for which the distance measurement period is optimized. Distance measurement zone 1 is an area in which V≧K1×D. This is an area in which the distance to the object is short and the moving speed is fast, or in other words, an area in which distance measurement must be performed using the shortest period. Distance measurement zone 2 is an area in which K1×D>V≧K2×D, which requires a mid-level period. Distance zone 3 is an area in which V<K2×D, where the distance to the object is long and the moving speed is slow, or in other words, an area in which it is acceptable to carry out distance measurement using a relatively long period. In other words, based on the distance input from distance measuring sensor 1 and the moving speed input from drive control unit 6, the autonomous vehicle determines, among the zones shown in FIG. 7, the zone to which its current state of movement belongs, and decides the distance measurement period that should be used based on the result of said determination.

In this embodiment, K1 is 3 (1/sec) and K2 is 1 (1/sec), and in distance measurement zone 1, distance measurement is carried out five times per second, while it is performed twice and once per second in distance measurement zone 2 and distance measurement zone 3, respectively.

In addition, while three distance measurement zones are set in FIG. 7, it is also acceptable if two or four or more distance measurement zones are set. Further, the borders between distance measurement zones are set in a linear fashion as straight lines in said drawing, but they may be set exponentially or quadratically depending on the acceleration properties, braking properties, ambient environment, etc., of the autonomous vehicle. It is also possible to use fuzzy control for the distance measurement period based on the membership function governing the speed and distance.

Figure 8:
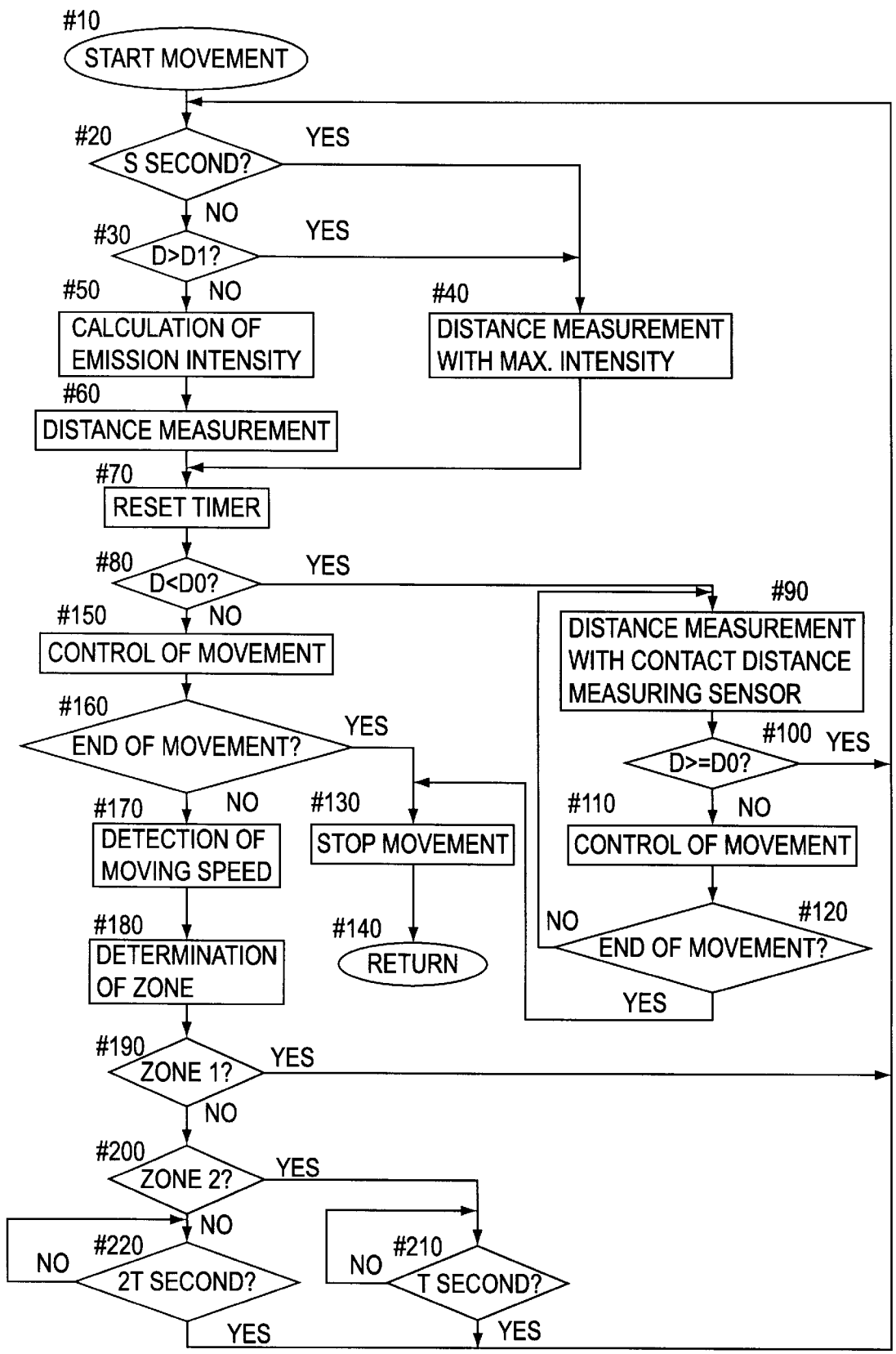
FIG. 8 is a flow chart to explain the distance measurement operation of the autonomous vehicle of the present invention.

FIG. 8 shows a flow chart pertaining to the distance measurement operation of the autonomous vehicle of this embodiment.

When the autonomous vehicle starts moving in step #10, it is determined in step #20 whether or not a prescribed period of time (S seconds) has elapsed since the previous distance measurement session.

Where it is determined that a prescribed period or longer has elapsed, it is possible that the ambient situation has greatly changed, and therefore distance measurement with an optimal emission intensity is not carried out and the program advances to step #40, in which distance measurement is carried out using the maximum emission intensity, and distance D that is thus measured is saved in the memory (the latest distance is saved in the memory).

On the other hand, where it is determined in step #20 that a prescribed period or longer has not elapsed since the last distance measurement session, it is determined in step #30 whether or not distance D measured in the last measurement session is longer than distance D1 for which measurement using the maximum emission intensity is necessary. Where it is determined in step #30 that said distance D is longer than distance D1 for which measurement using the maximum emission intensity is necessary, the program advances to step #40, in which distance measurement using the maximum emission intensity is performed. Where it is determined in step #30 that distance D in the previous measurement session is equal to or smaller than distance D1 for which measurement using the maximum emission intensity is necessary, the program advances to step #50, in which the optimal emission intensity for distance D is calculated. This is equivalent to obtaining optimal emission intensity P from distance D, which was explained with reference to FIG. 5. The program then advances to step #60, in which distance measurement is carried out using the emission intensity corresponding to the result of calculation in step #50, and distance D thus measured is saved in the memory. The program then advances to step #70, in which the timer to decide the distance measurement period is reset and the distance measurement operation is completed.

When distance measurement is completed, it is determined in step #80 whether or not distance D is shorter than distance D0 that is dependent on the contact distance measuring sensors (D0=50 mm in this embodiment). This is done because when the distance between the autonomous vehicle and the object has become fairly short, distance measuring sensor 1 can no longer perform accurate measurement, and distance measurement using the contact distance measuring sensors will therefore be performed instead. Where it is determined in step #80 that distance D is shorter than distance D0 that is dependent on the contact distance measuring sensors, distance measurement is performed in step #90 using the contact distance measuring sensors, and the resulting distance D is saved in the memory. It is then determined in step #100 whether or not distance D is equal to or exceeds distance D0 that is dependent on the contact distance measuring sensors. Where distance D is equal to or exceeds distance D0 that is dependent on the contact distance measuring sensors, distance measurement using the contact distance measuring sensors is ended and the program returns to step #20, in which distance measurement using non-contact distance measuring sensor 1 is carried out. Where it is determined in step #100 that distance D is not equal to or does not exceed distance D0 that is dependent on the contact distance measuring sensors, the movement of the autonomous vehicle is controlled in response to distance D.

It is then determined in step #120 whether or not an end movement command has been output. If an end movement command has been output, a control sequence to stop the movement of the autonomous vehicle is carried out in step #130. After that, the program advances to step #140 and returns to the main routine. Where it is determined in step #120 that an end movement command has not been output, the program returns to step #90 and the processes of steps #90 through #120 are repeated.

On the other hand, where it is determined in step #80 that distance D is equal to or exceeds distance D0 that is dependent on the contact distance measuring sensors, the program advances to step #150, in which the movement of the autonomous vehicle is controlled in response to distance D. This means that the speed is reduced, the autonomous vehicle is stopped, or the object is avoided, for example, in response to the distance to the object.

It is then determined in step #160 whether or not an end movement command has been output to the autonomous vehicle. If an end movement command has been output, a control sequence to stop the movement of the autonomous vehicle is followed in step #130, following which the program advances to step #140 and returns to the main routine.

If it is determined in step #160 that an end movement command has not been output, the program advances to step #170, in which moving speed V of the autonomous vehicle is detected. Then, in step #180, the distance measurement zone to which moving speed V and distance D of the autonomous vehicle belong is determined (from among the zones shown in FIG. 7).

First, it is determined in step #190 whether or not the result determined in step #180 is distance measurement zone 1. Where it is determined in step #190 that the result determined in step #180 is distance measurement zone 1, which means that distance measurement should be carried out using the shortest period (five times per second in this embodiment, or every 0.2 seconds), the program returns to step #20 and immediately moves on to the next distance measurement session.

Where it is determined in step #190 that the result determined in step #180 is not distance measurement zone 1, it is determined in step #200 whether or not the result determined in step #180 is distance measurement zone 2. Where it is determined in step #200 that the result determined in step #180 is distance measurement zone 2, the program advances to step #210 to perform distance measurement twice per second (i.e., every 0.5 seconds). After a prescribed standby period of T seconds (0.5 seconds in this embodiment) elapses, the program returns to step #20 and moves on to the next distance measurement session.

Where it is determined in step #200 that the result determined in step #180 is not distance measurement zone 2, the result determined in step #180 is distance measurement zone 3. Therefore, the program advances to step #220 to carry out distance measurement once per second (every 1.0 second). After a prescribed standby period of 2T seconds (1.0 second in this embodiment) elapses, the program returns to step #20 and moves on to the next distance measurement session.

Prescribed periods T and 2T are set to be 0.5 seconds and 1.0 second, respectively, in this embodiment, but since prescribed period T is determined based on the normal moving speed, etc., of the autonomous vehicle, it is not limited to these values. Naturally, with regard to the standby periods for distance measurement zones 3 and 2, it is necessary only that the standby period for distance measurement zone 3 be longer than that for distance measurement zone 2, and it is not necessary that their ratio be 2:1 as in this embodiment.

While an explanation was provided in connection with this embodiment based on a construction comprising a station and an autonomous vehicle, the present invention may be applied to a construction comprising an autonomous vehicle only.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An autonomous vehicle comprising:

a driver that moves the vehicle body;

a distance measuring sensor that periodically measures the distance to an object using a prescribed period;

a speed detector that detects the moving speed of the vehicle body; and a controller that controls said prescribed period based on the moving speed detected by said speed detector.

2. An autonomous vehicle claimed in claim 1, wherein said controller performs control such that said period becomes shorter as the moving speed of the vehicle body increases.

3. An autonomous vehicle claimed in claim 1, wherein said controller controls said prescribed period based on the moving speed detected by said speed detector and the distance detected by said distance measuring sensor.

4. An autonomous vehicle comprising:

a distance measuring sensor that periodically measures the distance to an object using a prescribed period; and a controller that controls an period for driving said distance measuring sensor based on the distance to the object that is detected by the distance measuring sensor.

5. An autonomous vehicle claimed in claim 4, wherein said controller performs control such that said period becomes shorter as the distance to the object decreases.

6. A method for controlling an autonomous vehicle comprising steps of:

moving the autonomous vehicle;

measuring the distance from the autonomous vehicle to an object;

controlling the movement of the autonomous vehicle in accordance with the measured distance;

determining a next measuring timing for executing a following measurement of the distance in accordance with the moving speed of the autonomous vehicle; and repeating said measuring steps, controlling step and determining step.

7. A method claimed in claim 6, wherein said timing is determined such that a period between the measurements of distances becomes shorter as the moving speed of the autonomous vehicle increases.

8. A method claimed in claim 6, wherein said next timing is determined based on the moving speed of the autonomous vehicle and the measured distance.

9. A method for controlling an autonomous vehicle comprising steps of:

moving the autonomous vehicle;

measuring the distance from the autonomous vehicle to an object;

controlling the movement of the autonomous vehicle in accordance with the measured distance;

determining a next measuring timing for executing a following measurement of the distance in accordance with the measured distance; and repeating said measuring steps, controlling step and determining step.

10. A method claimed in claim 9, wherein said timing is determined such that a period between the measurements of distances becomes shorter as the distance to the object decreases.

* * * * *